Jan. 4, 1966            C. G. SOER            3,227,407
CABLE SUPPORT CLIP FOR A VEHICLE BRAKE SYSTEM
Filed Aug. 27, 1964
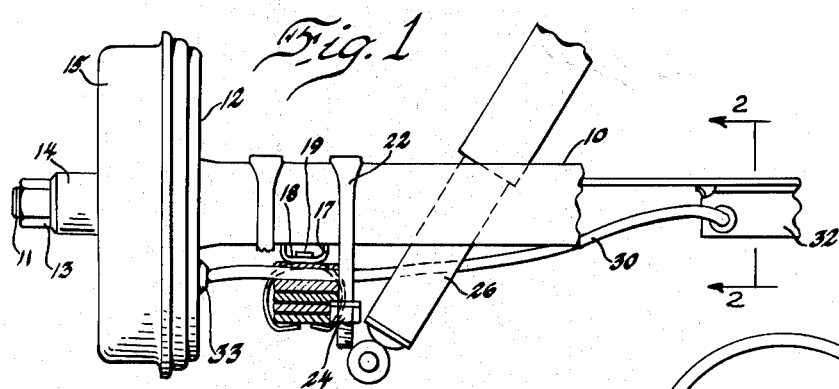
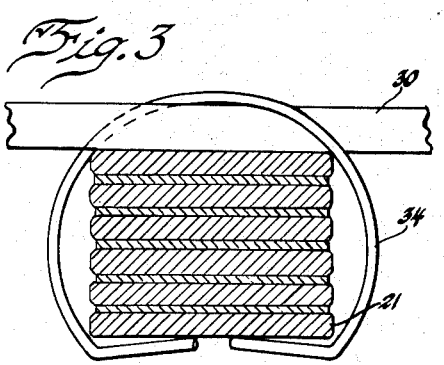
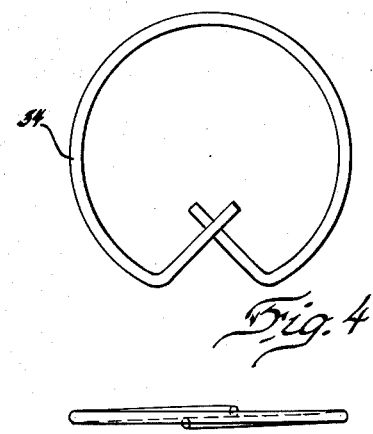
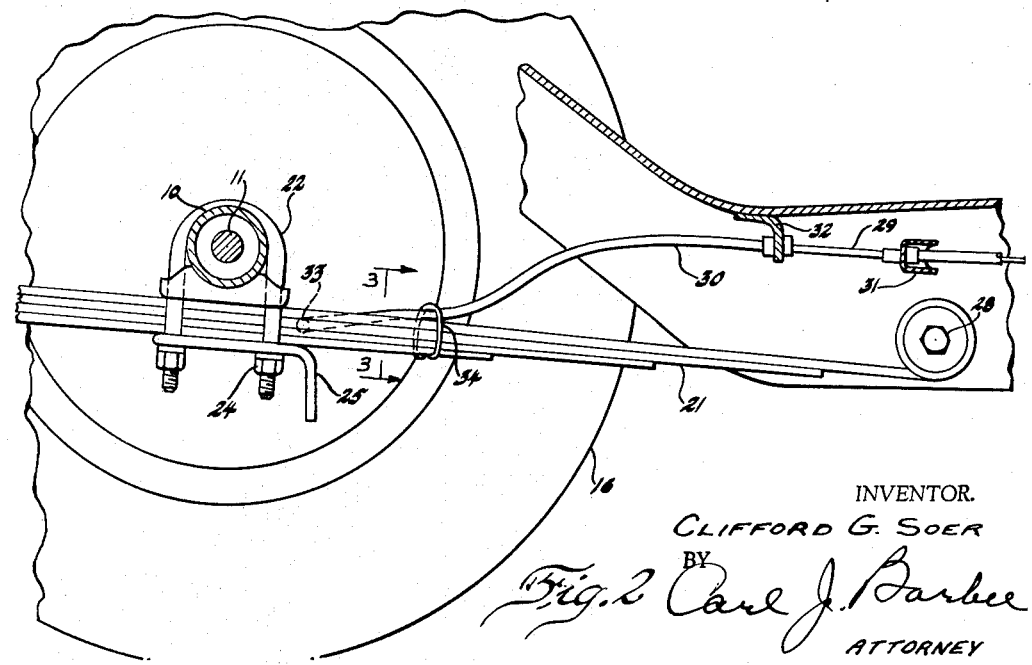
INVENTOR.
CLIFFORD G. SOER
BY
Carl J. Barbee
ATTORNEY

United States Patent Office 3,227,407
Patented Jan. 4, 1966

3,227,407
CABLE SUPPORT CLIP FOR A VEHICLE
BRAKE SYSTEM
Clifford G. Soer, Bristol, Wis., assignor to American Motors Corporation, Kenosha, Wis., a corporation of Maryland
Filed Aug. 27, 1964, Ser. No. 392,572
1 Claim. (Cl. 248—54)

This invention relates generally to a vehicle brake system and more particularly to a support clip for the cables of the emergency portion of the brake system.

A common type of vehicle brake system utilizes a sheath enclosed front cable having one end attached to an emergency brake handle projecting from the dash in the passenger compartment and the other end attached to a bellcrank located underneath the vehicle body. The bellcrank is in turn connected to an equalizer from which extend a pair of sheath enclosed rear cables. Each rear cable is operatively connected with the brake shoes of one of the rear wheels.

Pulling outward on the emergency brake handle causes the front cables to be drawn further into the passenger compartment and moves the bellcrank. This in turn draws the equalizer toward the front of the vehicle and causes each rear cable to move the associated brake shoes into engagement with the brake drum. A ratchet maintains the attached handle in position while the emergency brake is engaged. Turning the handle in a clockwise manner and depressing same, forces the front and rear cables back into their original position and releases the brakes.

Securing each of the sheath enclosed rear cables between the equalizer and the brake shoes is commonly accomplished by a clip or bracket bolted to the stationary torque tube or to an affiliated truss rod commonly used in vehicles with rear coil springs. It is necessary to secure the enclosed cables to prevent the fatigue produced by cable oscillation and to prevent contact with the vehicle under body which causes objectionable noise.

In vehicles having rear leaf springs and a moving propeller shaft without a torque tube, the clip must be attached to the vehicle under body. Since this requires tapping for the capscrews, it has heretofore been the custom to use a simple coil spring with a hook on each end to hold each enclosed cable to the adjacent leaf spring by hooking the coil spring around the leaf spring. A spring clip is generally used because of the constant upward and downward flexing of the leaf spring while the vehicle is in operation and the resulting changing of leaf spring cross section which is most pronounced in a leaf spring having a plurality of leaves. The coil spring is expensive and the hooks quickly break with use unless made of oversize cross section.

Applicant has devised a simple spring clip which is substantially less costly than the coil spring, is easily installed and has much longer life because of the greater cross section and its unique configuration which aids in holding the enclosed cable to the upward and downward flexing leaf spring. Basically the spring clip consists of a single length of steel spring wire which is bent to form substantially a circle with two ends further bent inward and overlapping each other at preferably an angle of 90°. When the clip is in position on the leaf spring, the downward and upward flexing of the leaf spring causes the clip spring ends in contact therewith to move outward and then return as to the leaf spring cross section increases and decreases. Thus the enclosed cable is secured by the clip to the flexing leaf spring at all times.

It is, therefore, an object of this invention to provide a new and improved spring type, cable support clip for a vehicle brake system.

Another object of this invention is to provide a spring type, cable support clip for a vehicle brake system that can be manufactured at lower cost.

Other objects and advantages will become apparent from the following description in conjunction with the attached drawings in which:

FIGURE 1 is a vertical end view of the left rear brake assembly of a vehicle but with the leaf spring shown in section where the rear enclosed cable is secured thereto by the clip of this invention.

FIGURE 2 is a vertical view along line 2—2 of FIGURE 1.

FIGURE 3 is an enlarged fragmentary sectional view taken on the line 3—3 of FIGURE 2.

FIGURE 4 is a plan view of the cable support clip of this invention.

FIGURE 5 is a front view of the cable support clip.

Referring to FIGURES 1 and 2, 10 is the axle tube for the left rear axle 11 of a vehicle. The axle tube 10 has secured thereto a conventional brake support plate 12. Attached to the left rear axle 11 by axle nut 13 is wheel hub 14. Brake drum 15 is mounted in a conventional manner on wheel hub 14. For the purpose of clarity, the associated wheel 16 for brake drum 15 is shown only in FIGURE 2.

Spring support bracket 17 is attached to axle tube 10 as by welding. A pilot opening 18 in bracket 17 is provided for the bolt 19 which with the nut (not shown) holds the leaf spring 21 together. Leaf spring 21, therefore, can be located and restrained on the bracket 17 with metal-to-metal contact. Leaf spring 21, as shown, is composed of a plurality of insert spaced leaves. It is to be understood that a spring utilizing a single leaf could also be used with the cable clip of this invention.

Securing leaf spring 21 to bracket 17 are U bolts 22 and associated nuts 24 in conjunction with shock absorber support bracket 25. Shock absorber 26, therefore, connects axle tube 10 as to the under body of the vehicle (not shown). A pair of conventional shackles (not shown) are utilized to hold the shorter or subsidiary leaves of leaf spring 21 to the main leaf. The ends of the shorter leaves, however, are free to move from the main leaf as the leaf spring 21 flexes. Leaf spring 21 is attached to the vehicle under body by rubber cushioned bolts 28 extending through suitable eyes in the ends of the leaf spring.

Left rear brake cable 29, which is enclosed by flexible sheath 30, is connected at one end to a conventional, movable equalizer 31. The movement of the equalizer, as mentioned previously, is effected by movement of a bellcrank (not shown) which in turn is actuated by the familiar emergency brake handle in the passenger compartment through the associated front brake cable. Sheath 30 is connected at one end to a mounting 32 attached to the underside of the vehicle as by welding. The other end of sheath 30 is connected with the inner side of brake support plate at boss 33. Cable 29 extends through sheath 30 from the equalizer 31 and attaches to a parking brake lever (not shown) mounted on brake support plate 12. Movement of the cable 29 causes the brake shoes to engage or disengage brake drum 15. As mentioned previously, a ratchet located on the emergency brake handle is utilized to maintain the emergency brake in the "on" position when desired. Cable support clip 34 as shown in detail in FIGURES 3, 4 and 5 resiliently and tightly secures cable 29 in sheath 30 to leaf spring 21 at a point between the sheath end connected to mounting 32 and the end connected to boss 33.

In operation, as the vehicle moves along a road, imperfections therein will cause the leaf spring 21 to flex upward and downward with the shock absorber 26 dampening this springing action. If the vehicle body and the leaf spring 21 where same is attached to axle tube 10 move further apart, the curvature of the leaf spring 21 increases. The unsupported ends of the insert spaced subsidiary leaves then move away from the main leaf increasing in effect the leaf spring cross section which in turn forces the ends of brake support clip 34 that are in contact therewith in an outward direction. As the leaf spring 21 and vehicle body move toward each other reducing the curvature of leaf spring 21 and its cross section, the clip ends will contract due to the clip configuration and spring wire material utilized. Thus the cable 29 within sheath 30 is tightly held to the leaf spring 21 by clip 34 regardless of the direction in which the spring flexes. Because the cable 29 and its sheath 30 are restrained during vehicle operation, fatigue and breakage are reduced; also noise from contact with the vehicle under body is eliminated. The above advantages are accomplished by a novel brake cable support clip that is particularly economical to manufacture and install.

Having thus described the invention, it will be apparent to those skilled in the art that various modifications and changes can be made without departing from the spirit of the invention or the scope of the appended claim.

I claim:

For use on an automotive vehicle having a body member and a ground wheel, the combination of a resilient leaf spring interconnected between the body member and ground wheel for resiliently suspending the body member relative to the wheel, said leaf spring having a flat and uninterrupted under surface; a flexible brake cable having one end connected to the body member and the other end connected adjacent the wheel and said cable crossing over and lying upon the leaf spring; a support clip for flexibly holding the brake cable relative to the leaf spring; said clip comprising a continuous length of spring steel wire having a loop portion encircling the cable and the leaf spring and a terminal portion at each end, each bent inwardly into the area circumscribed by the loop portion, said clip being under continuous constricture tension around the cable and the leaf spring and the terminal ends each having sliding frictional contact with the flat under surface of the leaf spring and the loop portion of the clip being circumferentially expanded so that the terminal ends of the clip are spaced from each other in end to end fashion; said clip in unexpanded condition having its terminal end portions crossing over each other in X-shaped fashion.

References Cited by the Examiner

UNITED STATES PATENTS

| | | | |
|---|---|---|---|
| 1,818,659 | 8/1931 | Tournier | 248—68 |
| 2,064,290 | 12/1936 | Campbell et al. | 248—72 |
| 2,612,540 | 9/1952 | Ridgers et al. | 248—49 X |
| 2,767,946 | 10/1956 | Weeks | 248—50 |

FOREIGN PATENTS

| | | |
|---|---|---|
| 594,965 | 4/1934 | Germany. |
| 674,557 | 4/1939 | Germany. |
| 235,274 | 3/1945 | Switzerland. |

CLAUDE A. LE ROY, *Primary Examiner.*